US010462742B2

(12) United States Patent
Li et al.

(10) Patent No.: US 10,462,742 B2
(45) Date of Patent: Oct. 29, 2019

(54) METHOD AND APPARATUS FOR POWER CONSUMPTION REDUCTION IN MOBILE COMMUNICATIONS

(71) Applicant: MediaTek Inc., Hsinchu (TW)

(72) Inventors: Xiu-Sheng Li, Taipei (TW); Wanchi Lee, Taoyuan (TW); Wei-Jen Chen, Taipei (TW)

(73) Assignee: MEDIATEK INC., Hsinchu (TW)

(*) Notice: Subject to any disclaimer, the term of this patent is extended or adjusted under 35 U.S.C. 154(b) by 0 days.

(21) Appl. No.: 15/719,833

(22) Filed: Sep. 29, 2017

(65) Prior Publication Data

US 2018/0092033 A1 Mar. 29, 2018

Related U.S. Application Data

(60) Provisional application No. 62/401,323, filed on Sep. 29, 2016.

(51) Int. Cl.
*H04W 52/02* (2009.01)
*H04B 7/26* (2006.01)
(Continued)

(52) U.S. Cl.
CPC ...... *H04W 52/0225* (2013.01); *H04B 7/2643* (2013.01); *H04L 5/0053* (2013.01);
(Continued)

(58) Field of Classification Search
CPC ......... H04W 52/0216; H04W 52/0225; H04W 52/028; H04W 72/0406; H04W 72/042;
(Continued)

(56) References Cited

U.S. PATENT DOCUMENTS

2008/0095110 A1\* 4/2008 Montojo ............... H04L 5/0053
370/330
2008/0159439 A1 7/2008 Bitran
(Continued)

FOREIGN PATENT DOCUMENTS

CN 101686105 A 3/2010
CN 102036404 A 4/2011
(Continued)

OTHER PUBLICATIONS

State Intellectual Property Office, International Search Report and Written Opinion for PCT Patent Application No. PCT/CN2017/104472, Jan. 8, 2018.
(Continued)

*Primary Examiner* — Kevin D Mew
(74) *Attorney, Agent, or Firm* — Han IP PLLC; Andy M. Han

(57) ABSTRACT

Various solutions for power consumption reduction with respect to user equipment (UE) in mobile communications are described. A UE may receive first control information in a first transmission time interval (TTI). The UE may determine whether to turn on a radio frequency transceiver of the UE in a second TTI according to the first control information. The first control information indicates whether downlink data is scheduled for the apparatus in the second TTI. The UE may further monitor first control information in a first radio carrier. The UE may determine whether to turn on a radio frequency transceiver of the UE to receive downlink information in a second radio carrier according to the first control information. The first control information indicates whether downlink information for the apparatus is scheduled in the second radio carrier.

19 Claims, 9 Drawing Sheets

(51) Int. Cl.
*H04W 72/04* (2009.01)
*H04L 27/26* (2006.01)
*H04W 72/12* (2009.01)
*H04L 5/00* (2006.01)

(52) U.S. Cl.
CPC ........ *H04L 5/0094* (2013.01); *H04L 27/2601* (2013.01); *H04L 27/2602* (2013.01); *H04W 52/028* (2013.01); *H04W 52/0216* (2013.01); *H04W 72/042* (2013.01); *H04W 72/0406* (2013.01); *H04W 72/0446* (2013.01); *H04W 72/12* (2013.01); *H04W 72/1289* (2013.01); *Y02D 70/00* (2018.01); *Y02D 70/10* (2018.01); *Y02D 70/12* (2018.01); *Y02D 70/122* (2018.01); *Y02D 70/126* (2018.01); *Y02D 70/1242* (2018.01); *Y02D 70/1262* (2018.01); *Y02D 70/1264* (2018.01); *Y02D 70/21* (2018.01); *Y02D 70/26* (2018.01); *Y02D 70/449* (2018.01)

(58) Field of Classification Search
CPC ............. H04W 72/0446; H04W 72/12; H04W 72/1289; H04L 5/0053; H04L 5/0094; H04L 27/2601; H04L 27/2602; H04B 7/2643
See application file for complete search history.

(56) References Cited

U.S. PATENT DOCUMENTS

| | | | |
|---|---|---|---|
| 2009/0016252 A1 | 1/2009 | Ho et al. | |
| 2013/0051355 A1 | 2/2013 | Hong | |
| 2014/0269451 A1* | 9/2014 | Papasakellariou ... | H04B 7/2656 370/280 |
| 2014/0269454 A1* | 9/2014 | Papasakellariou .... | H04W 52/34 370/280 |
| 2014/0369247 A1* | 12/2014 | Sambhwani ......... | H04W 76/28 370/311 |
| 2015/0009953 A1* | 1/2015 | Park .................. | H04W 72/1273 370/330 |
| 2015/0016377 A1 | 1/2015 | Kim et al. | |
| 2015/0071203 A1 | 3/2015 | Lee et al. | |
| 2015/0334729 A1* | 11/2015 | Ji ...................... | H04W 72/0453 370/336 |
| 2015/0341960 A1* | 11/2015 | Quan .................... | H04L 5/0044 370/329 |
| 2016/0119948 A1* | 4/2016 | Damnjanovic et al. ..................... H04L 1/1812 370/280 | |
| 2016/0360550 A1* | 12/2016 | Chen ..................... | H04L 5/0096 |
| 2016/0381490 A1* | 12/2016 | Rico Alvarino ........ | H04W 4/70 370/330 |
| 2017/0048886 A1* | 2/2017 | Sun ........................ | H04W 72/14 |
| 2017/0111160 A1* | 4/2017 | Chen ..................... | H04L 1/1812 |
| 2017/0272224 A1* | 9/2017 | Ang ........................ | H04L 5/0051 |
| 2018/0020408 A1* | 1/2018 | Zhang .................. | H04W 76/28 |
| 2018/0077651 A1* | 3/2018 | Nory .................. | H04W 52/146 |
| 2018/0092033 A1* | 3/2018 | Li .......................... | H04B 7/2643 |
| 2018/0092090 A1 | 3/2018 | Li et al. | |

FOREIGN PATENT DOCUMENTS

| | | |
|---|---|---|
| CN | 102111851 A | 6/2011 |
| CN | 102123524 A | 7/2011 |
| CN | 102726105 A | 10/2012 |
| WO | WO 2012165733 A1 | 12/2012 |
| WO | WO 2014134988 A1 | 9/2014 |

OTHER PUBLICATIONS

State Intellectual Property Office, International Search Report and Written Opinion for PCT Patent Application No. PCT/CN2017/104474, Jan. 4, 2018.
Taiwan Intellectual Property Office, Office Action for Taiwan Patent Application No. 106133970, Sep. 18, 2018.
Taiwan Intellectual Property Office, Office Action for Taiwan Patent Application No. 106133970, Nov. 30, 2018.

* cited by examiner

METHOD AND APPARATUS FOR POWER CONSUMPTION REDUCTION IN MOBILE COMMUNICATIONS

CROSS REFERENCE TO RELATED PATENT APPLICATION

The present disclosure claims the priority benefit of U.S. Provisional Patent Application No. 62/401,323, filed on 29 Sep. 2016, the content of which is incorporated by reference in its entirety.

TECHNICAL FIELD

The present disclosure is generally related to mobile communications and, more particularly, to power consumption reduction with respect to user equipment in mobile communications.

BACKGROUND

Unless otherwise indicated herein, approaches described in this section are not prior art to the claims listed below and are not admitted as prior art by inclusion in this section.

There are various well-developed and well-defined cellular communications technologies in telecommunications that enable wireless communications using mobile terminals, or user equipment (UE). For example, the Global System for Mobile communications (GSM) is a well-defined and commonly used communications system, which uses time division multiple access (TDMA) technology, which is a multiplex access scheme for digital radio, to send voice, video, data, and signaling information (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Long-Term Evolution (LTE), as well as its derivatives such as LTE-Advanced and LTE-Advanced Pro, is a standard for high-speed wireless communication for mobile phones and data terminals. In developing communication technologies, UE power consumption is always an important aspect for investigation.

In traditional communication systems, downlink control signal is used for the network side to transmit important message to the UE side including indication of the reception of downlink data. The UE needs to receive the downlink control signal as well as the downlink data for the UE. Therefore, if the downlink control signal is not well scheduled, the UE may need to turn on its radio frequency transceiver to keep monitoring the downlink control signal and the possible downlink data. It will consume significant power consumption for the UE to keep turning on its radio frequency transceiver or keep receiving downlink signaling. If there is no downlink data is scheduled during the on duration of the UE's radio frequency transceiver, the UE power would be wasted and the power management would be inefficient.

Accordingly, it is important for the UE to properly determine receiving duration of its radio frequency transceiver to receive downlink signaling when necessary. Therefore, in developing future communication system, it is needed to provide methodologies for the UE to receive downlink signaling in an efficient way and reduce power consumption for power saving.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues with respect to power consumption reduction for a communication apparatus. In implementations in accordance with the present disclosure, the communication apparatus may monitor downlink control information and determine whether downlink data is scheduled. The communication apparatus is able to turn on its radio frequency transceiver for receiving the downlink data when necessary to reduce power consumption and save power.

In one aspect, a method may involve an apparatus receiving first control information in a first transmission time interval (TTI). The method may also involve the apparatus determining whether to turn on a radio frequency (RF) transceiver of the apparatus in a second TTI according to the first control information. The first control information may indicate whether downlink data for the apparatus is scheduled in the second TTI.

In another aspect, a method may involve an apparatus monitoring first control information in a first radio carrier. The method may also involve the apparatus determining whether to turn on a RF transceiver of the apparatus to receive downlink information in a second radio carrier according to the first control information. The first control information may indicate whether downlink information for the apparatus is scheduled in the second radio carrier In yet another aspect, a method may involve an apparatus monitoring control information in a first sub-frequency band of a radio carrier. The method may also involve the apparatus determining whether to adjust a RF transceiver of the apparatus according to the control information. The RF transceiver turned on solely for receiving bandwidth of the first sub-frequency band of the radio carrier in a power saving mode.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to power consumption reduction with respect to user equipment in mobile communications. According to the present disclosure, a number of possible solutions may be implemented separately or jointly. That is, although these possible solutions may be described below separately, two or more of these possible solutions may be implemented in one combination or another.

Figure 1:
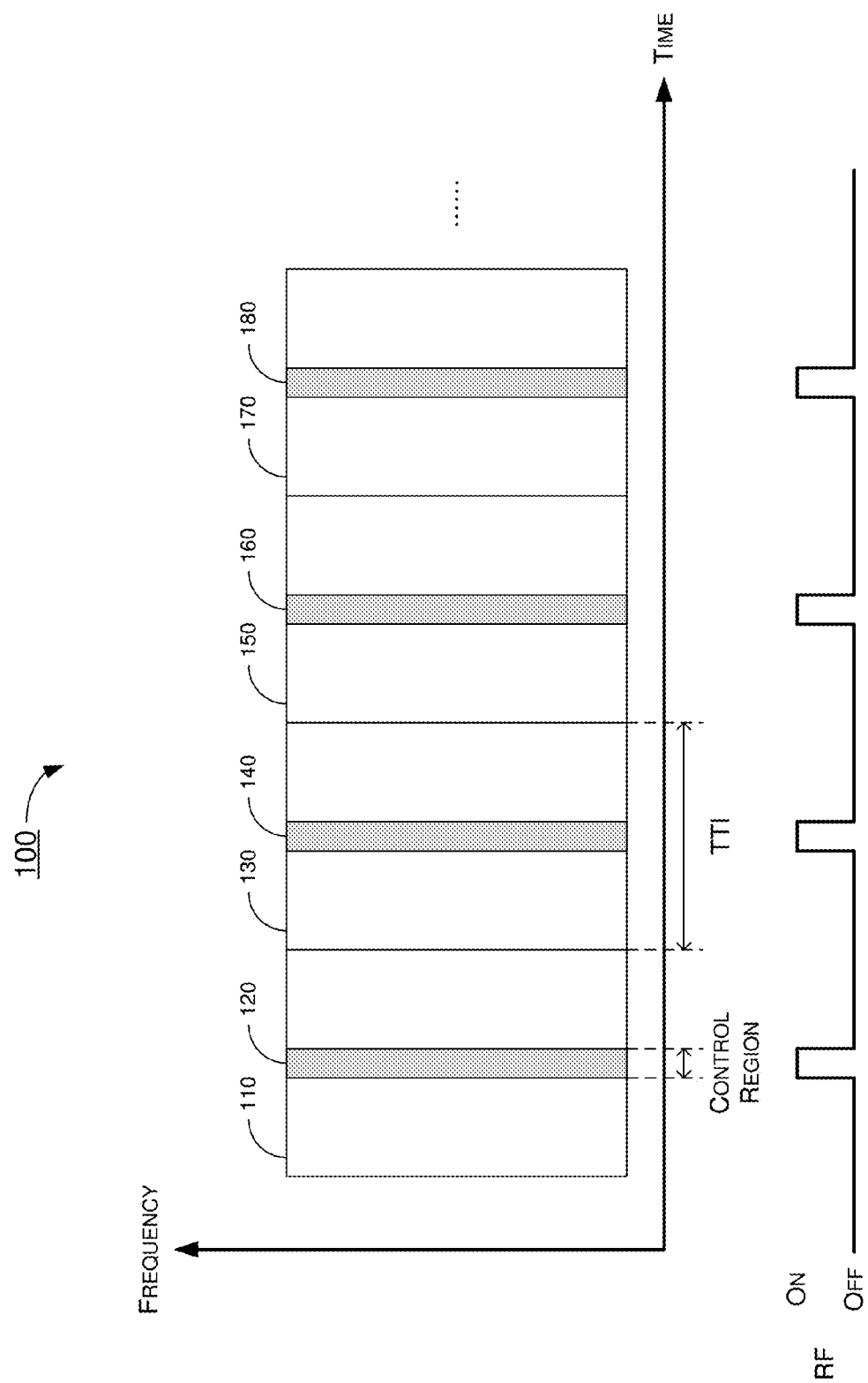
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a user equipment (UE) and a network apparatus, which may be a part of a wireless network (e.g., a LTE network, a LTE-Advanced network, a LTE-Advanced Pro network, a 5G network, a new radio network or an Internet of Things network). The network apparatus is able to transmit downlink control information and downlink data to the UE. The UE may comprise a radio frequency (RF) transceiver for receiving the downlink control information and the downlink data. The network apparatus may use the downlink control information to indicate the UE to receive the downlink data for the UE. The downlink control information may be scheduled in advance or early launched in a transmission time interval (TTI). A TTI is a scheduling unit of a communication network which may be, for example and without limitation, a transmission sub-frame in a LTE network or a transmission slot in a 5G network. The UE may be configured to receive and decode the downlink control information to determine whether there will be downlink data scheduled for the UE.

As showed in FIG. 1, the downlink control information is scheduled in the control regions 120, 140, 160 and 180 in each TTI 110, 130, 150 and 170. According to implementations of the present disclosure, first control information in a first TTI is used to indicate whether downlink data for the UE is scheduled in a second TTI. Specifically, the downlink control information in control region 120 of TTI 110 is used to indicate whether downlink data for the UE is scheduled in TTI 130. The downlink control information in control region 140 of TTI 130 is used to indicate whether downlink data for the UE is scheduled in TTI 150 and so on. The UE may be configured to turn on its RF transceiver to receiver the downlink control information in control region 120 and decode the downlink control information to determine whether there will be downlink data scheduled in TTI 130. In an event that the downlink control information indicates that the downlink data is scheduled in TTI 130, the UE may be configured to turn on its RF transceiver to receiver the downlink data in TTI 130. In an event that the downlink control information indicates that no downlink data is scheduled in TTI 130, the UE may be configured to turn off its RF transceiver in TTI 130 to reduce power consumption and save power.

Accordingly, since the control information for TTI 130 is scheduled in advance or early launched in control region 120 of TTI 110, the UE is able to decode the control information in advance. In an event that the UE can finish the decoding of the control information before the beginning of TTI 130, the UE is able to determine whether to turn off the RF transceiver in TTI 130 instead of keep turning on the RF transceiver and waiting for the decoding result of the control information. It should be noted that, the UE may only turn off the RF transceiver in the data regions of TTI 130 in an event that the UE determines that there is no downlink data scheduled in TTI 130, the UE may still need to turn on the RF transceiver to receive control region 140 in TTI 130.

The control information for a specific TTI is cross-TTI scheduled before the specific TTI. In some implementations, the control information for a specific TTI may be scheduled before a partial TTI, a whole TTI or a plurality of TTIs in advance the specific TTI as long as the control information for the specific TTI can be successfully decoded by the UE before the beginning of the specific TTI. How early or how many TTIs for the control information should be cross-TTI scheduled in advance may be configured by higher layer signaling (e.g., radio resource control (RRC) message) or by physical layer signaling (e.g., scheduling downlink control indicator (DCI)). For example, the time duration between the control information and the specific TTI may be dynamically indicated by L1 (e.g., physical layer) signaling. The time duration between the control information and the specific TTI may also be configured by RRC layer without L1 indication. The time duration between the control information and the specific TTI may also be configured by RRC layer with multiple possible values and be further indicated by L1 (e.g., physical layer) signaling with one of the multiple possible values. The positions of control regions may be configured by the network apparatus via higher layer signaling. For example, the control region may be configured at beginning of every TTI or at middle of every TTI. The downlink control information may be transmitted in a physical downlink control channel (PDCCH) or an enhanced PDCCH. The downlink data may be transmitted in a physical downlink shared channel (PDSCH).

Figure 2:
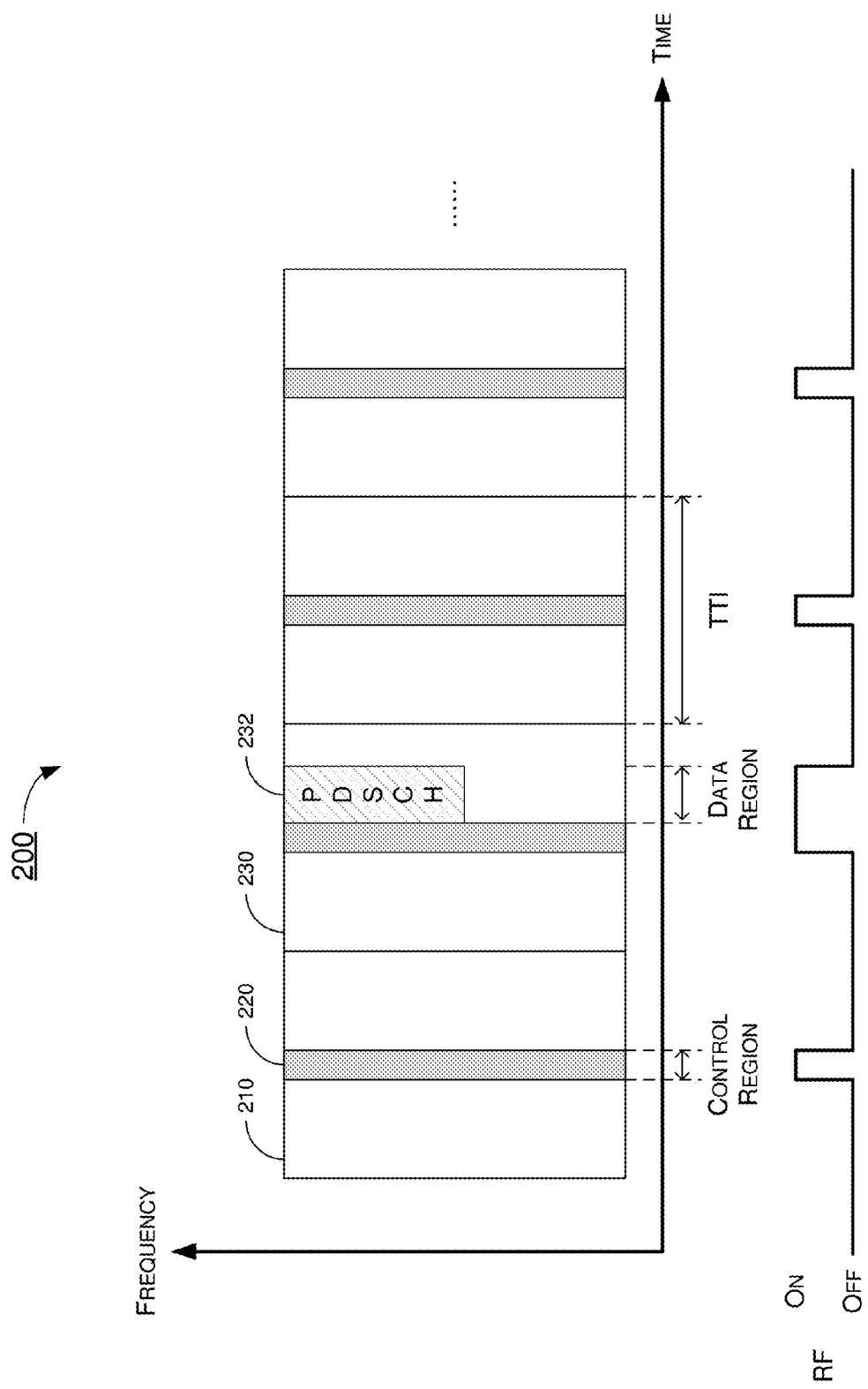
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a network apparatus, which may be a part of a wireless network (e.g., a LTE network, a LTE-Advanced network, a LTE-Advanced Pro network, a 5G network, a new radio network or an Internet of Things network). The network apparatus is able to transmit downlink control information and downlink data to the UE. The UE may comprise a RF transceiver for receiving the downlink control information and the downlink data. In scenario 200, the network apparatus may schedule the control information for TTI 230 in control region 220 in TTI 210. The control information in control region 220 may indicate that downlink data 232 is scheduled in TTI 230. Downlink data 232 is transmitted in a PDSCH. After receiving control region 220 and decoding the control information, the UE is able to determine the time-frequency region of downlink data 232. The UE may be configured to turn on the RF transceiver in the determined time-frequency region (i.e., data region) within TTI 230 to receive downlink data 232 and turn off the RF transceiver in the rest time to reduce power consumption and save power.

In some implementations, when the network apparatus has downlink data assigned for the UE, the network apparatus may be configured to schedule the downlink data in time division multiple access (TDMA) resource allocation rather than frequency division multiple access (FDMA) resource allocation. That is, the downlink data is spanned in frequency bands within a limited time duration or a short time duration. Accordingly, the UE may only turn on the RF transceiver for a limited time to receive the downlink data rather than turn on the RF transceiver for a whole TTI duration to reduce power consumption and save power. As showed in FIG. 2, the UE may only turn on the RF transceiver in the control region and the data region of TTI 230 and turn off the RF transceiver after receiving the data region.

In some implementations, the frequency region or frequency span of the PDSCH may be configured to be less than, greater than or identical to the frequency region or frequency span of the PDCCH. The frequency region or frequency span of the PDSCH may be configured to be overlapped or not overlapped with the frequency region or frequency span of the PDCCH. The UE may be configured to turn on the RF transceiver in two frequency spans to receive the PDSCH and the PDCCH at the same time in an event that the PDSCH and the PDCCH are scheduled in different frequency regions or frequency spans.

Figure 3:
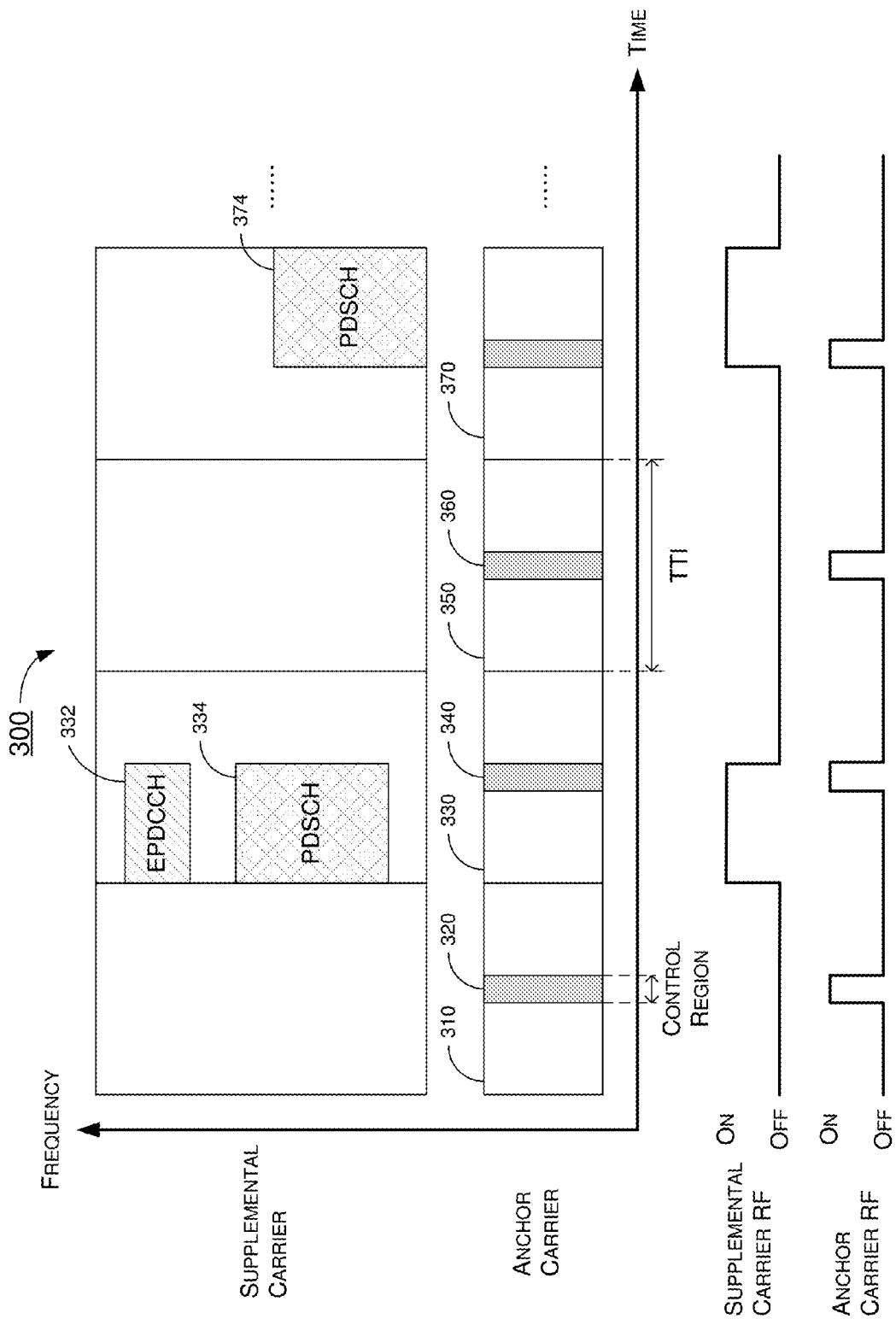
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a network apparatus, which may be part of a wireless network (e.g., a LTE network, a LTE-Advanced network, a LTE-Advanced Pro network, a 5G network, a new radio network or an Internet of Things network). The network apparatus is able to transmit downlink control information and downlink data to the UE. The UE is configured to establish a first radio carrier (e.g., anchor carrier) and a second radio carrier (e.g., supplemental carrier) with the network apparatus. The UE may comprise an anchor carrier RF transceiver for receiving signals on the anchor carrier and a supplemental carrier RF transceiver for receiving signals on the supplemental carrier. The anchor carrier RF transceiver and the supplemental carrier RF transceiver may be implemented in a single RF transceiver or implemented in separate RF transceivers.

In scenario 300, the network apparatus may schedule first control information in control region 320 in TTI 310. The UE is configured to turn on the anchor carrier RF transceiver to monitor the first control information in the anchor carrier. The first control information may be used to indicate whether downlink information (e.g., downlink control information or downlink data) for the UE is scheduled in the supplemental carrier. The UE may be configured to determine whether to turn on the supplemental carrier RF transceiver to receive the downlink information in the supplemental carrier according to the first control information. Specifically, the first control information may indicate that second control information is scheduled in enhanced PDCCH (EPDCCH) 332 of the supplemental carrier in TTI 330. After receiving control region 320 and decoding the first control information, the UE is able to determine to turn on the supplemental carrier RF transceiver to receive the second control information. The second control information may further indicate that downlink data is scheduled in PDSCH 334 of the supplemental carrier in TTI 330. The UE may further be configured to receive the downlink data scheduled in TTI 330.

The first control information is cross-TTI scheduled before the second control information. In some implementations, the first control information may be scheduled before a partial TTI, a whole TTI or a plurality of TTIs in advance the second control information as long as the first control information can be successfully decoded by the UE before the beginning of the second control information. The positions of control regions may be configured by the network apparatus via higher layer signaling. The downlink control information may be transmitted in a PDCCH or an enhanced PDCCH. The downlink data may be transmitted in a PDSCH.

In an event that the control information in the anchor carrier indicate that no downlink information is scheduled in the supplemental carrier, the UE may be configured to turn off the supplemental carrier RF transceiver to reduce power consumption and save power. For example, the control information in control region 340 in TTI 330 does not indicate any downlink information for TTI 350. After receiving control region 340 and decoding the control information, the UE is able to determine that there is no downlink information in the supplemental carrier and turn off the supplemental carrier RF transceiver in TTI 350. Accordingly, since the control information is cross-carrier scheduled, the UE may only need to turn on the anchor carrier RF transceiver to monitor the control information in the anchor carrier without turning on the supplemental carrier RF transceiver for power saving. The UE may only turn on the supplemental carrier RF transceiver when necessary (e.g., when downlink information in the supplemental carrier is indicated in the anchor carrier).

In some implementations, the bandwidth of the supplemental carrier is greater than the bandwidth of the anchor carrier. Generally, when a RF transceiver is configured to receiver a wideband carrier, the power consumption of which is greater than receiving a narrowband carrier. Thus, it will reduce power consumption for a UE in an event that the UE may only monitor a first radio carrier with narrow bandwidth and receive downlink information via a second radio carrier with wide bandwidth when necessary. Accordingly, the power consumption of the supplemental carrier RF transceiver is greater than the power consumption of the anchor carrier RF transceiver. It will reduce power consumption for the UE in an event that the UE may only monitor the anchor carrier and receive downlink information via the supplemental carrier when necessary.

In some implementations, the control information in the anchor carrier may directly indicate the downlink data scheduled in the supplemental carrier. Specifically, as showed in FIG. 3, the control information in control region 360 in TTI 350 may indicate that downlink data is scheduled in PDSCH 374 of the supplemental carrier in TTI 370. The control information in control region 360 may directly indicate the time-frequency region information of PDSCH 374. After receiving control region 360 and decoding the control information, the UE is able to determine to turn on the supplemental carrier RF transceiver to receive the downlink data scheduled in TTI 370.

Figure 4:
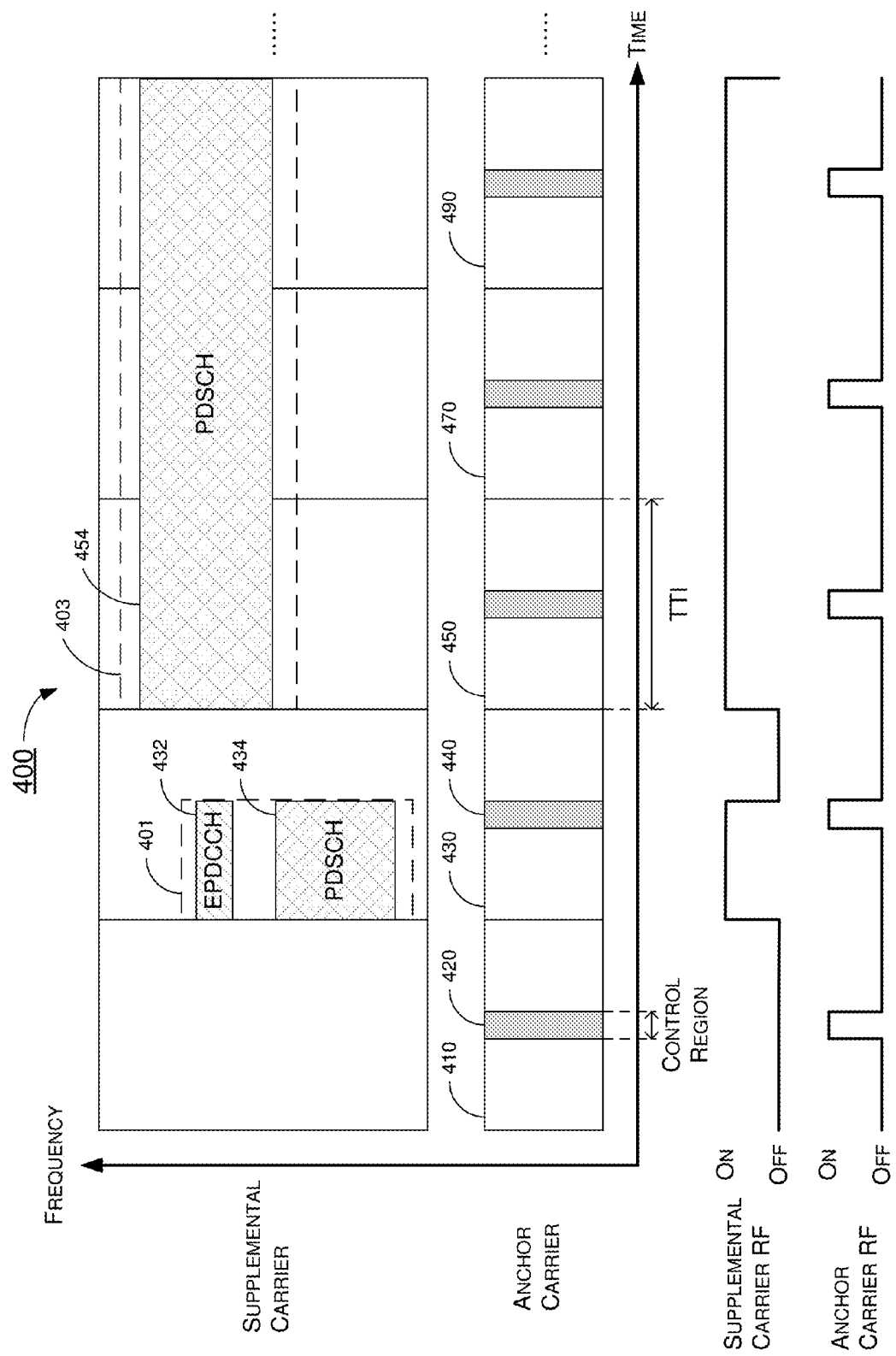
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a UE and a network apparatus, which may be part of a wireless network (e.g., a LTE network, a LTE-Advanced network, a LTE-Advanced Pro network, a 5G network, a new radio network or an Internet of Things network). The network apparatus is able to transmit downlink control information and downlink data to the UE. The UE is configured to establish a first radio carrier (e.g., anchor carrier) and a second radio carrier (e.g., supplemental carrier) with the network apparatus. The UE may comprise an anchor carrier RF transceiver for receiving signals on the anchor carrier and a supplemental carrier RF transceiver for receiving signals on the supplemental carrier. The anchor carrier RF transceiver and the supplemental carrier RF transceiver may be implemented in a single RF transceiver or implemented in separate RF transceivers.

In scenario 400, the control information in control region 420 may further indicate the frequency information of the downlink information in TTI 430. Specifically, the control information in control region 420 may indicate the frequency range of EPDCCH 432 and PDSCH 434. After receiving control region 420 and decoding the control information, the UE is able to determine the frequency span of EPDCCH 432 and PDSCH 434. The UE may be configured to turn on the supplemental carrier RF transceiver solely for a virtual carrier 401 which can cover the frequency span of EPDCCH 432 and PDSCH 434 rather than turning on the supplemental carrier RF transceiver for whole supplemental carrier. The frequency range of virtual carrier 401 is less than the frequency range of the supplemental carrier. For example, the frequency span of the supplemental carrier may be 100 MHz and the frequency span of virtual carrier 401 may only be 50 MHz. As aforementioned, it will consume more power consumption for a RF transceiver to cover wider frequency range. Accordingly, in an event that the UE is able to determine the frequency range of the downlink information, the UE may only turn on the supplemental carrier RF transceiver for a virtual carrier with narrower frequency span to reduce power consumption and save power.

Similarly, the control information in the anchor carrier may directly indicate the downlink data scheduled in the supplemental carrier. Specifically, as showed in FIG. 4, the control information in control region 440 in TTI 430 may directly indicate the time-frequency region information of the downlink data scheduled in PDSCH 454 of the supplemental carrier in TTI 450, 470 and 490. After receiving control region 440 and decoding the control information, the UE is able to determine the time-frequency region of PDSCH 454 and turn on the supplemental carrier RF transceiver for a virtual carrier 403 to receive the downlink data scheduled in PDSCH 454. Virtual carrier 403 may be determined by the UE to cover the time-frequency range of PDSCH 454.

In some implementations, the UE may be configured to establish the anchor carrier and the supplemental carrier with the same network apparatus (e.g., base station, cell, eNB or gNB). The UE may also be configured to establish the anchor carrier and the supplemental carrier with different network apparatus. For example, the UE may establish the anchor carrier with a first network apparatus and establish the supplemental carrier with a second network apparatus. The anchor carrier and the supplemental carrier may be two independent radio carriers or may be component carriers of carrier aggregation (CA). The anchor carrier and the supplemental carrier may be intra band radio carriers or may be inter band radio carriers. The implementations of the anchor carrier and the supplemental carrier may be varied depends on practical applications.

Figure 5:
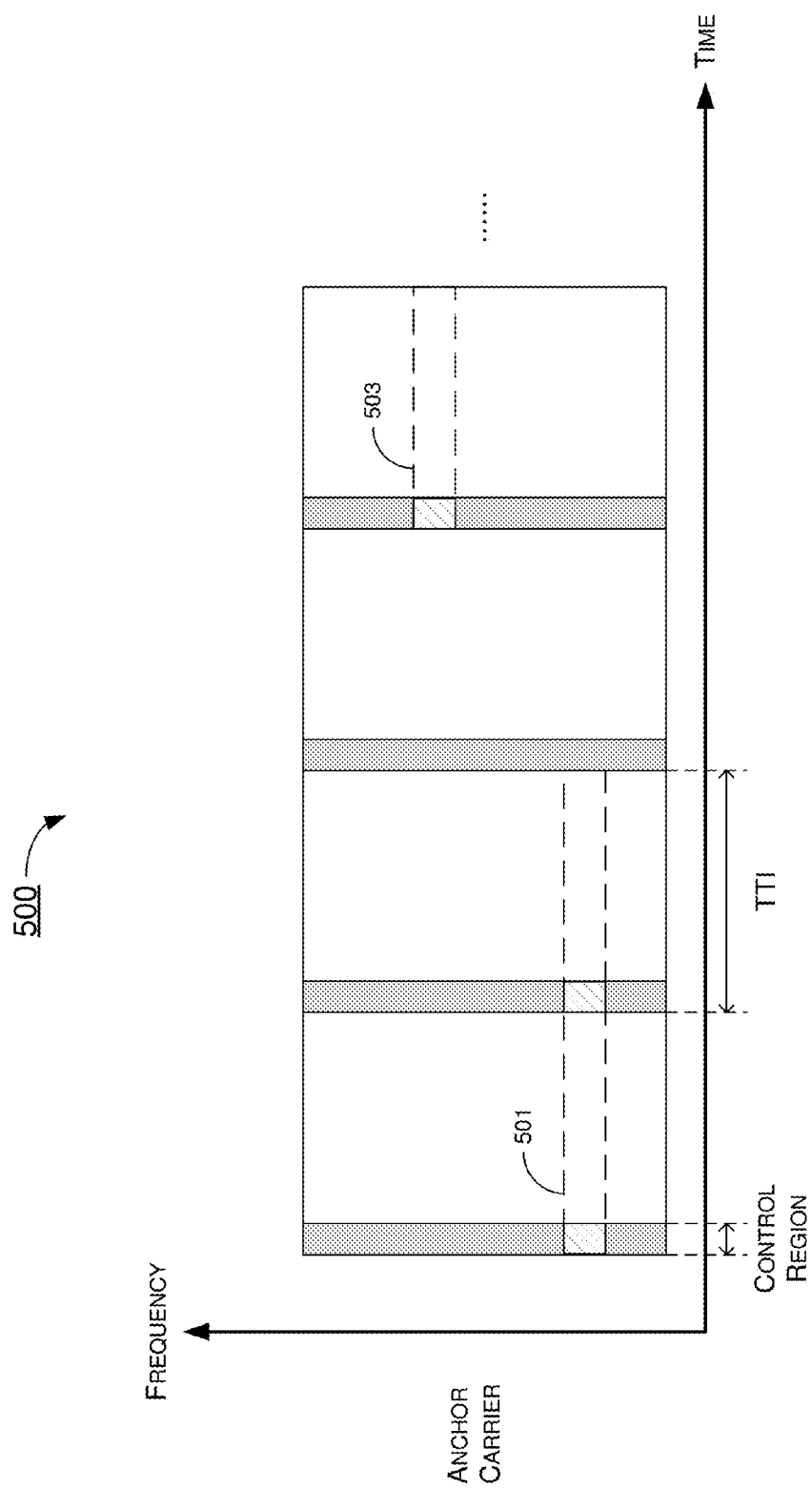
FIG. 5 is a diagram depicting an example scenario under schemes in accordance with implementations of the present disclosure.

FIG. 5 illustrates an example scenario 500 under schemes in accordance with implementations of the present disclosure. Scenario 500 involves a UE and a network apparatus, which may be part of a wireless network (e.g., a LTE network, a LTE-Advanced network, a LTE-Advanced Pro network, a 5G network, a new radio network or an Internet of Things network). The network apparatus is able to transmit downlink control information and downlink data to the UE. The UE is configured to establish a radio carrier (e.g., anchor carrier) with the network apparatus. The UE may comprise an anchor carrier RF transceiver for receiving signals on the anchor carrier.

In scenario 500, the UE may be configured to monitor control information in first sub-frequency band 501 of the anchor carrier and determine whether to adjust the anchor carrier RF transceiver according to the control information. Specifically, the UE may be configured to only monitor a small portion of the control information such as, for example and without limitation, paging messages, reference signals or system information block (SIB). The network apparatus may be configured to schedule the small portion of the control information in a small frequency band (e.g., 200 kHz). Thus, the UE may be configured to only turn on the anchor carrier RF transceiver for the receiving bandwidth of the first sub-frequency band 501 in a power saving mode. As aforementioned, it will consume more power consumption for a RF transceiver to cover wider frequency range. Accordingly, in an event that the UE only need to monitor a small portion of the downlink information, the UE may only turn on the anchor carrier RF transceiver for a sub-frequency band with narrower frequency span to reduce power consumption and save power.

In some implementations, the control information in first sub-frequency band 501 may carry a control channel indication (e.g., enhanced PDCCH indication) for indicating the UE to perform a corresponding action (e.g., frequency hopping, switching to a normal mode or reporting channel quality information). The enhanced PDCCH indication may indicate the UE to perform frequency hopping for changing the sub-frequency band. For example, when the channel quality of first sub-frequency band 501 is less than a predetermined value, the network apparatus may use the enhanced PDCCH indication to indicate the UE to change the sub-frequency band. After receiving the enhanced PDCCH indication, the UE may be configured to adjust the anchor carrier RF transceiver from first sub-frequency band 501 to second sub-frequency band 503.

In some implementations, the enhanced PDCCH indication may indicate the UE to report channel quality indicator (CQI) for estimating the channel quality of current sub-frequency band. After receiving the enhanced PDCCH indication, the UE may be configured to perform signal measurements and perform CQI report.

In some implementations, the enhanced PDCCH indication may indicate the UE to switch from a power saving mode to a normal mode. In the normal mode, the UE may be configured to monitor whole frequency band of the anchor carrier rather than monitoring a sub-frequency band of the anchor carrier. After receiving the enhanced PDCCH indication, the UE may be configured to adjust the anchor carrier RF transceiver to cover full bandwidth of the anchor carrier.

In some implementations, the UE may comprise a first processor (e.g., a little core) and a second processor (e.g., a big core). The computing capability of the little core may be configured as machine type communication (MTC) or IoT compatible. When the UE is operated in a power saving mode (e.g., MTC/IoT-like mode), the UE may be configured to only enable the little core to reduce power consumption. When the UE is operated in a normal mode, the UE may be configured to enable the big core for better performance. For example, the UE may only enable the little core when monitoring the sub-frequency band of the anchor carrier and enable the big core when monitoring the full bandwidth of the anchor carrier. The little core and the big core may be implemented in a single processor or may be implemented as two independent processors.

In some implementations, one TTI may be configured as a transmission slot with 7 symbols or 14 symbols. One TTI may also be configured as a mini-slot which may comprise symbols less than 7 symbols (e.g., 1 to 6 symbols). One TTI may further be configured as a transmission sub-frame with 1 millisecond. The symbol number, sub-carrier spacing (SCS) between symbols or time duration of one TTI may be configured or defined by network side depends on the practical applications. Implementations in accordance with the present disclosure can be applied to any configuration of TTI as illustrated above.

Illustrative Implementations

Figure 6:
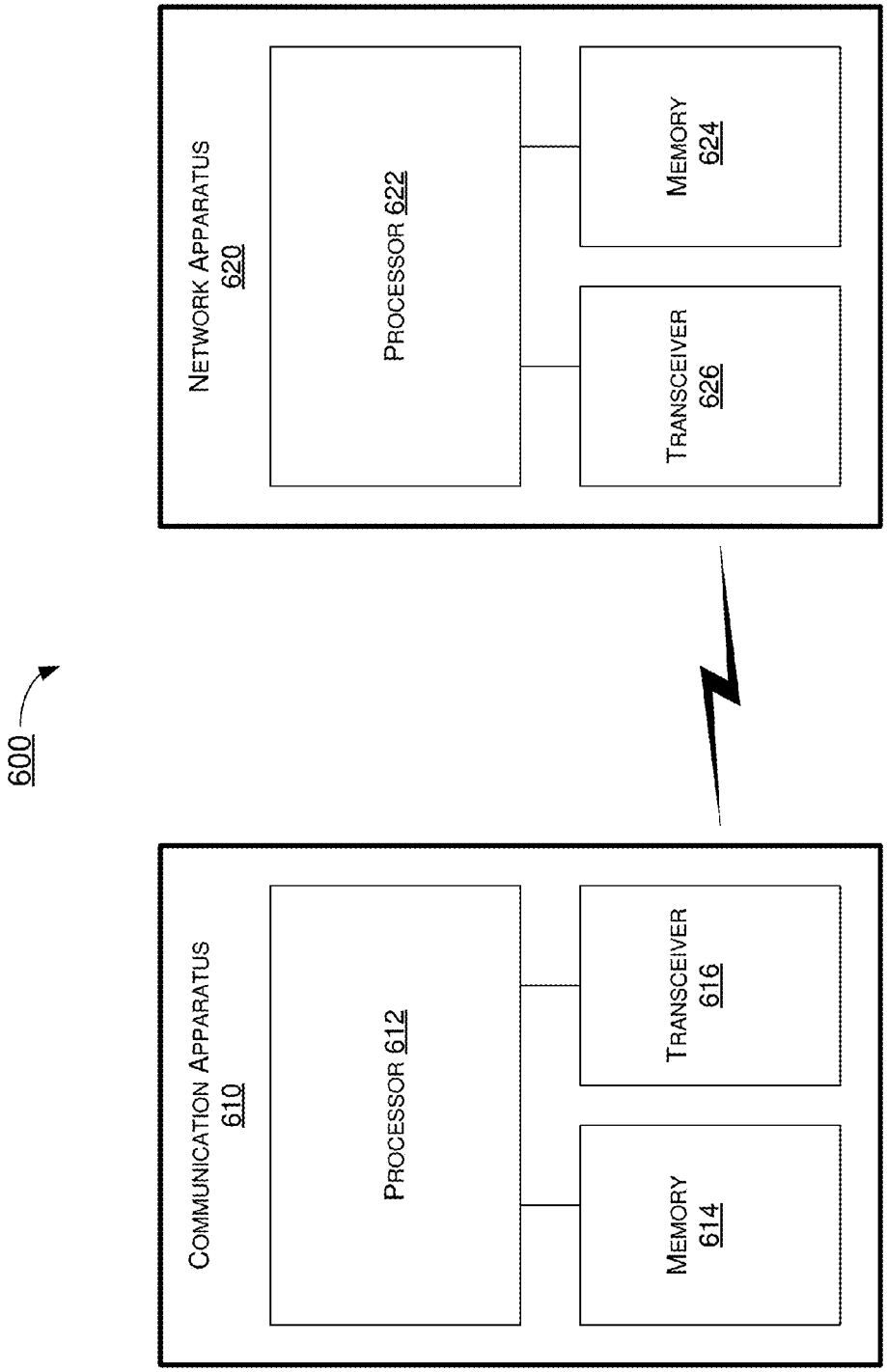
FIG. 6 is a block diagram of an example communication apparatus and an example network apparatus in accordance with an implementation of the present disclosure.

FIG. 6 illustrates an example communication apparatus 610 and an example network apparatus 620 in accordance with an implementation of the present disclosure. Each of communication apparatus 610 and network apparatus 620 may perform various functions to implement schemes, techniques, processes and methods described herein pertaining to power consumption reduction with respect to user equipment in wireless communications, including scenarios 100, 200, 300, 400 and 500 described above as well as processes 700, 800 and 900 described below.

Communication apparatus 610 may be a part of an electronic apparatus, which may be a user equipment (UE) such as a portable or mobile apparatus, a wearable apparatus, a wireless communication apparatus or a computing apparatus. For instance, communication apparatus 610 may be implemented in a smartphone, a smartwatch, a personal digital assistant, a digital camera, or a computing equipment such as a tablet computer, a laptop computer or a notebook computer. Communication apparatus 610 may also be a part of a machine type apparatus, which may be an IoT apparatus such as an immobile or a stationary apparatus, a home apparatus, a wire communication apparatus or a computing apparatus. For instance, communication apparatus 610 may be implemented in a smart thermostat, a smart fridge, a smart door lock, a wireless speaker or a home control center. Alternatively, communication apparatus 610 may be implemented in the form of one or more integrated-circuit (IC) chips such as, for example and without limitation, one or more single-core processors, one or more multi-core processors, or one or more complex-instruction-set-computing (CISC) processors. Communication apparatus 610 may include at least some of those components shown in FIG. 6 such as a processor 612, for example. communication apparatus 610 may further include one or more other components not pertinent to the proposed scheme of the present disclosure (e.g., internal power supply, display device and/or user interface device), and, thus, such component(s) of communication apparatus 610 are neither shown in FIG. 6 nor described below in the interest of simplicity and brevity.

Network apparatus 620 may be a part of an electronic apparatus, which may be a network node such as a base station, a small cell, a router or a gateway. For instance, network apparatus 620 may be implemented in an eNodeB in a LTE, LTE-Advanced or LTE-Advanced Pro network or in a gNB in a 5G, NR or IoT network. Alternatively, network apparatus 620 may be implemented in the form of one or more IC chips such as, for example and without limitation, one or more single-core processors, one or more multi-core processors, or one or more CISC processors. Network apparatus 620 may include at least some of those components shown in FIG. 6 such as a processor 622, for example. Network apparatus 620 may further include one or more other components not pertinent to the proposed scheme of the present disclosure (e.g., internal power supply, display device and/or user interface device), and, thus, such component(s) of network apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including power consumption reduction in a device (e.g., as represented by communication apparatus 610) and a network (e.g., as represented by network apparatus 620) in accordance with various implementations of the present disclosure.

In some implementations, communication apparatus 610 may also include a transceiver 616 coupled to processor 612 and capable of wirelessly transmitting and receiving data. In some implementations, communication apparatus 610 may further include a memory 614 coupled to processor 612 and capable of being accessed by processor 612 and storing data therein. In some implementations, network apparatus 620 may also include a transceiver 626 coupled to processor 622 and capable of wirelessly transmitting and receiving data. In some implementations, network apparatus 620 may further include a memory 624 coupled to processor 622 and capable of being accessed by processor 622 and storing data therein. Accordingly, communication apparatus 610 and network apparatus 620 may wirelessly communicate with each other via transceiver 616 and transceiver 626, respectively. To aid better understanding, the following description of the operations, functionalities and capabilities of each of communication apparatus 610 and network apparatus 620 is provided in the context of a mobile communication environment in which communication apparatus 610 is implemented in or as a communication apparatus or a UE and network apparatus 620 is implemented in or as a network node of a communication network.

In some implementations, processor 612 may be configured to receive, via transceiver 616, downlink control information and downlink data transmitted from network apparatus 620. The downlink control information may be scheduled in a transmission time interval (TTI). A TTI is a scheduling unit of a communication network which may be, for example and without limitation, a transmission subframe in a LTE network or a transmission slot in a 5G network. Processor 612 may be configured to receive and decode the downlink control information to determine whether there will be downlink data scheduled for communication apparatus 610.

In some implementations, processor 612 may be configured to turn on transceiver 616 to receiver first downlink control information in a first TTI and decode the first downlink control information to determine whether there will be downlink data scheduled in a second TTI. The first downlink control information in the first TTI is used to indicate whether downlink data for communication apparatus 610 is scheduled in the second TTI. In an event that the first downlink control information indicates that the downlink data is scheduled in the second TTI, processor 612 may be configured to turn on transceiver 616 to receiver the downlink data in the second TTI. In an event that the first downlink control information indicates that no downlink data is scheduled in the second TTI, processor 612 may be configured to turn off transceiver 616 in the second TTI to reduce power consumption and save power. It should be noted that, processor 612 may only turn off transceiver 616 in the data regions of second TTI in an event that processor 612 determines that there is no downlink data scheduled in the second TTI, processor 612 may still need to turn on transceiver 616 to receive control region in the second TTI.

The control information for a specific TTI is cross-TTI scheduled before the specific TTI. In some implementations, the control information for a specific TTI may be scheduled before a partial TTI, a whole TTI or a plurality of TTIs in advance the specific TTI as long as the control information for the specific TTI can be successfully decoded by processor 612 of communication apparatus 610 before the beginning of the specific TTI. How early or how many TTIs for the control information should be cross-TTI scheduled in advance may be configured by higher layer signaling (e.g., radio resource control (RRC) message) or by physical layer signaling (e.g., downlink control indicator (DCI)). The positions of control regions may be configured by network apparatus 620 via higher layer signaling. For example, the control region may be configured at beginning of every TTI or at middle of every TTI. The downlink control information may be transmitted in a physical downlink control channel (PDCCH) or an enhanced PDCCH. The downlink data may be transmitted in a physical downlink shared channel (PDSCH).

In some implementations, the first control information in the first TTI may indicate that downlink data is scheduled in the second TTI. After receiving and decoding the first control information, processor 612 is able to determine the time-frequency region of the downlink data in the second TTI. Processor 612 may be configured to turn on transceiver 616 in the determined time-frequency region (i.e., data region) within the second TTI to receive the downlink data and turn off transceiver 616 in the rest time to reduce power consumption and save power. Processor 612 may also be configured to turn on transceiver 616 in two frequency spans to receive the PDSCH and the PDCCH at the same time in an event that the PDSCH and the PDCCH are scheduled in different frequency regions or frequency spans.

In some implementations, processor 612 may be configured to establish, via transceiver 616, a first radio carrier (e.g., anchor carrier) and a second radio carrier (e.g., supplemental carrier) with network apparatus 620. Transceiver 616 may further comprise an anchor carrier RF transceiver for receiving signals on the anchor carrier and a supplemental carrier RF transceiver for receiving signals on the supplemental carrier. The anchor carrier RF transceiver and the supplemental carrier RF transceiver may be implemented in a single RF transceiver or implemented in separate RF transceivers.

In some implementations, processor 612 may be configured to turn on the anchor carrier RF transceiver to monitor first control information in the anchor carrier. The first control information may be used to indicate whether downlink information (e.g., downlink control information or downlink data) for communication apparatus 610 is scheduled in the supplemental carrier. Processor 612 may be configured to determine whether to turn on the supplemental carrier RF transceiver to receive the downlink information in the supplemental carrier according to the first control information. Specifically, the first control information may indicate that second control information is scheduled in enhanced PDCCH (EPDCCH) of the supplemental carrier in the second TTI. After receiving and decoding the first control information, processor 612 is able to determine to turn on the supplemental carrier RF transceiver to receive the second control information. The second control information may further indicate that downlink data is scheduled in PDSCH of the supplemental carrier in the second TTI. Processor 612 may further be configured to receive the downlink data scheduled in the second TTI.

In an event that the control information in the anchor carrier indicate that no downlink information is scheduled in the supplemental carrier, processor 612 may be configured to turn off the supplemental carrier RF transceiver to reduce power consumption and save power. Accordingly, since the control information is cross-carrier scheduled, processor 612 may only need to turn on the anchor carrier RF transceiver to monitor the control information in the anchor carrier without turning on the supplemental carrier RF transceiver for power saving. Processor 612 may only turn on the supplemental carrier RF transceiver when necessary (e.g., when downlink information in the supplemental carrier is indicated in the anchor carrier).

In some implementations, the control information in the anchor carrier may directly indicate the downlink data scheduled in the supplemental carrier. Specifically, the control information in a first TTI may indicate that downlink data is scheduled in PDSCH of the supplemental carrier in a second TTI. The control information may directly indicate the time-frequency region information of PDSCH. After receiving and decoding the control information, processor 612 is able to determine to turn on the supplemental carrier RF transceiver to receive the downlink data scheduled in the second TTI.

In some implementations, the control information in a first TTI may further indicate the frequency information of the downlink information in the second TTI. Specifically, the control information in the first TTI may indicate the frequency range of EPDCCH and PDSCH scheduled in the second TTI. After receiving decoding the control information, processor 612 is able to determine the frequency span of the EPDCCH and the PDSCH in the second TTI. Processor 612 may be configured to turn on the supplemental carrier RF transceiver only for a virtual carrier which can cover the frequency span of the EPDCCH and the PDSCH rather than turning on the supplemental carrier RF transceiver for whole supplemental carrier. The frequency range of the virtual carrier is less than the frequency range of the supplemental carrier. Accordingly, in an event that processor 612 is able to determine the frequency range of the downlink information, processor 612 may only turn on the supplemental carrier RF transceiver for a virtual carrier with narrower frequency span to reduce power consumption and save power.

In some implementations, communication apparatus 610 may be configured to establish the anchor carrier and the supplemental carrier with the same network apparatus. Communication apparatus 610 may also be configured to establish the anchor carrier and the supplemental carrier with different network apparatus. For example, communication apparatus 610 may establish the anchor carrier with a first network apparatus and establish the supplemental carrier with a second network apparatus. The anchor carrier and the supplemental carrier may be two independent radio carriers or may be component carriers of carrier aggregation (CA). The anchor carrier and the supplemental carrier may be intra band radio carriers or may be inter band radio carriers.

In some implementations, processor 612 may be configured to monitor control information in a first sub-frequency band of the anchor carrier and determine whether to adjust the anchor carrier RF transceiver according to the control information. Specifically, processor 612 may be configured to only monitor a small portion of the control information such as, for example and without limitation, paging messages, reference signals or system information block (SIB). Network apparatus 620 may be configured to schedule the small portion of the control information in a small frequency band (e.g., 200 kHz). Thus, processor 612 may be configured to only turn on the anchor carrier RF transceiver for the receiving bandwidth of the first sub-frequency band in a power saving mode.

In some implementations, the control information in the first sub-frequency band may carry a control channel indication (e.g., enhanced PDCCH indication) for indicating the UE to perform a corresponding action (e.g., frequency hopping, switching to a normal mode or reporting channel quality information). The enhanced PDCCH indication may indicate communication apparatus 610 to perform frequency hopping for changing the sub-frequency band. For example, when the channel quality of the first sub-frequency band is less than a predetermined value, network apparatus 620 may use the enhanced PDCCH indication to indicate communication apparatus 610 to change the sub-frequency band. After receiving the enhanced PDCCH indication, processor 612 may be configured to adjust the anchor carrier RF transceiver from the first sub-frequency band to a second sub-frequency band.

In some implementations, the enhanced PDCCH indication may indicate communication apparatus 610 to report channel quality indicator (001) for estimating the channel quality of current sub-frequency band. After receiving the enhanced PDCCH indication, processor 612 may be configured to perform signal measurements and perform CQI report.

In some implementations, the enhanced PDCCH indication may indicate communication apparatus 610 to switch from a power saving mode to a normal mode. In the normal mode, processor 612 may be configured to monitor whole frequency band of the anchor carrier rather than monitoring a sub-frequency band of the anchor carrier. After receiving the enhanced PDCCH indication, processor 612 may be configured to adjust the anchor carrier RF transceiver to cover full bandwidth of the anchor carrier.

In some implementations, processor 612 may further comprise a first processor (e.g., a little core) and a second processor (e.g., a big core). The computing capability of the little core may be configured as machine type communication (MTC) or IoT compatible. When communication apparatus 610 is operated in a power saving mode (e.g., MTC/IoT-like mode), communication apparatus 610 may be configured to only enable the little core to reduce power consumption. When communication apparatus 610 is operated in a normal mode, communication apparatus 610 may be configured to enable the big core for better performance. For example, communication apparatus 610 may only enable the little core when monitoring the sub-frequency band of the anchor carrier and enable the big core when monitoring the full bandwidth of the anchor carrier. The little core and the big core may be implemented in a single processor or may be implemented as two independent processors.

Illustrative Processes

Figure 7:
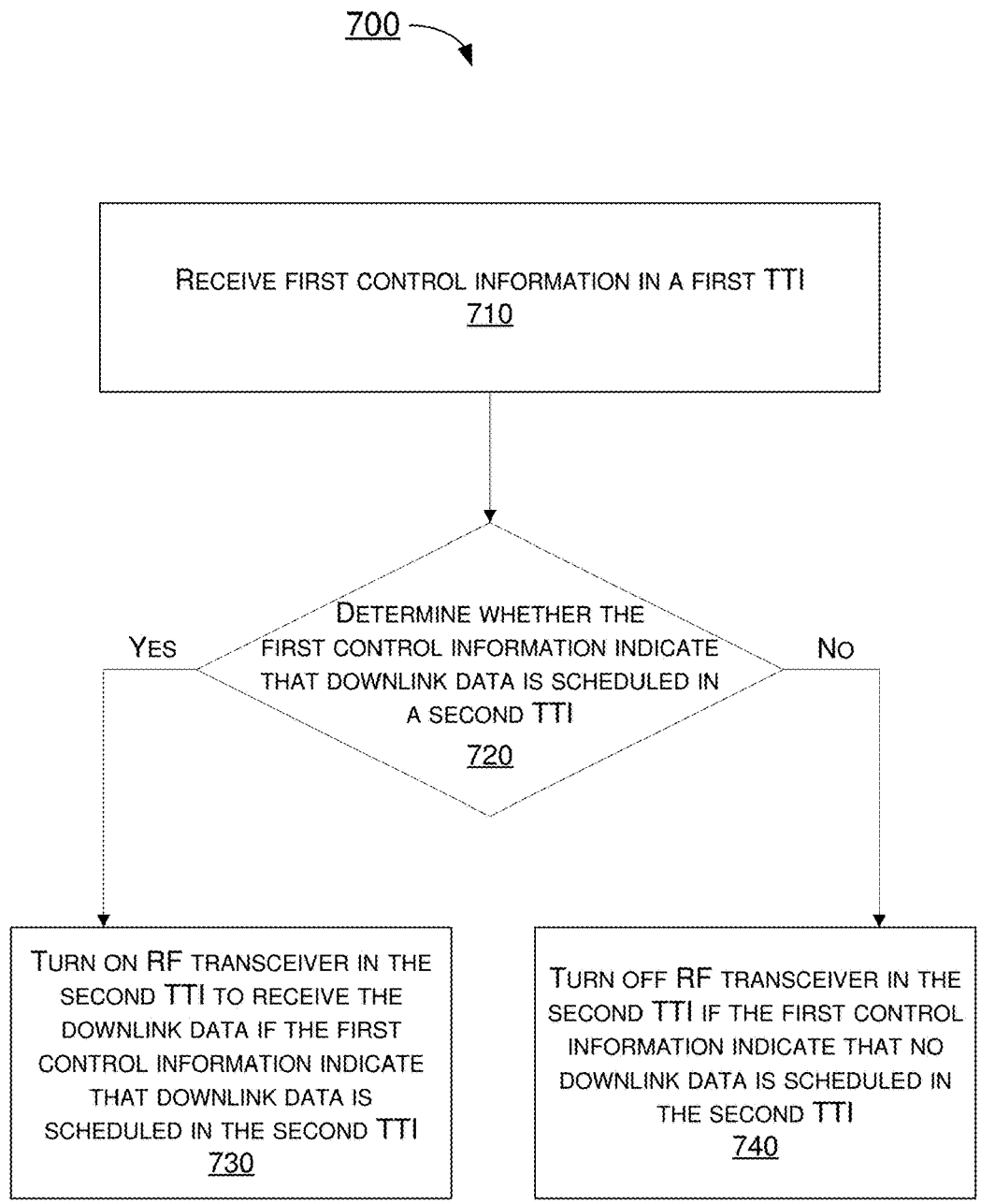
FIG. 7 is a flowchart of an example process in accordance with an implementation of the present disclosure.

FIG. 7 illustrates an example process 700 in accordance with an implementation of the present disclosure. Process 700 may be an example implementation of scenarios 100 and 200, whether partially or completely, with respect to power consumption reduction in accordance with the present disclosure. Process 700 may represent an aspect of implementation of features of communication apparatus 610. Process 700 may include one or more operations, actions, or functions as illustrated by one or more of blocks 710, 720, 730 and 740. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively, in a different order. Process 700 may be implemented by communication apparatus 610 or any suitable UE or machine type devices. Solely for illustrative purposes and without limitation, process 700 is described below in the context of communication apparatus 610. Process 700 may begin at block 710.

At 710, process 700 may involve communication apparatus 610 receiving first control information in a first TTI. Process 700 may proceed from 710 to 720.

At 712, process 700 may involve communication apparatus 610 determining whether the first control information indicate that downlink data is scheduled in a second TTI. If yes, process 700 may proceed from 720 to 730. If no, process 700 may proceed from 720 to 740.

At 713, process 700 may involve communication apparatus 610 turning on RF transceiver in the second TTI to receive the downlink data if the first control information indicate that downlink data is scheduled in the second TTI.

At 714, process 700 may involve communication apparatus 610 turning off RF transceiver in the second TTI if the first control information indicate that no downlink data is scheduled in the second TTI.

Figure 8:
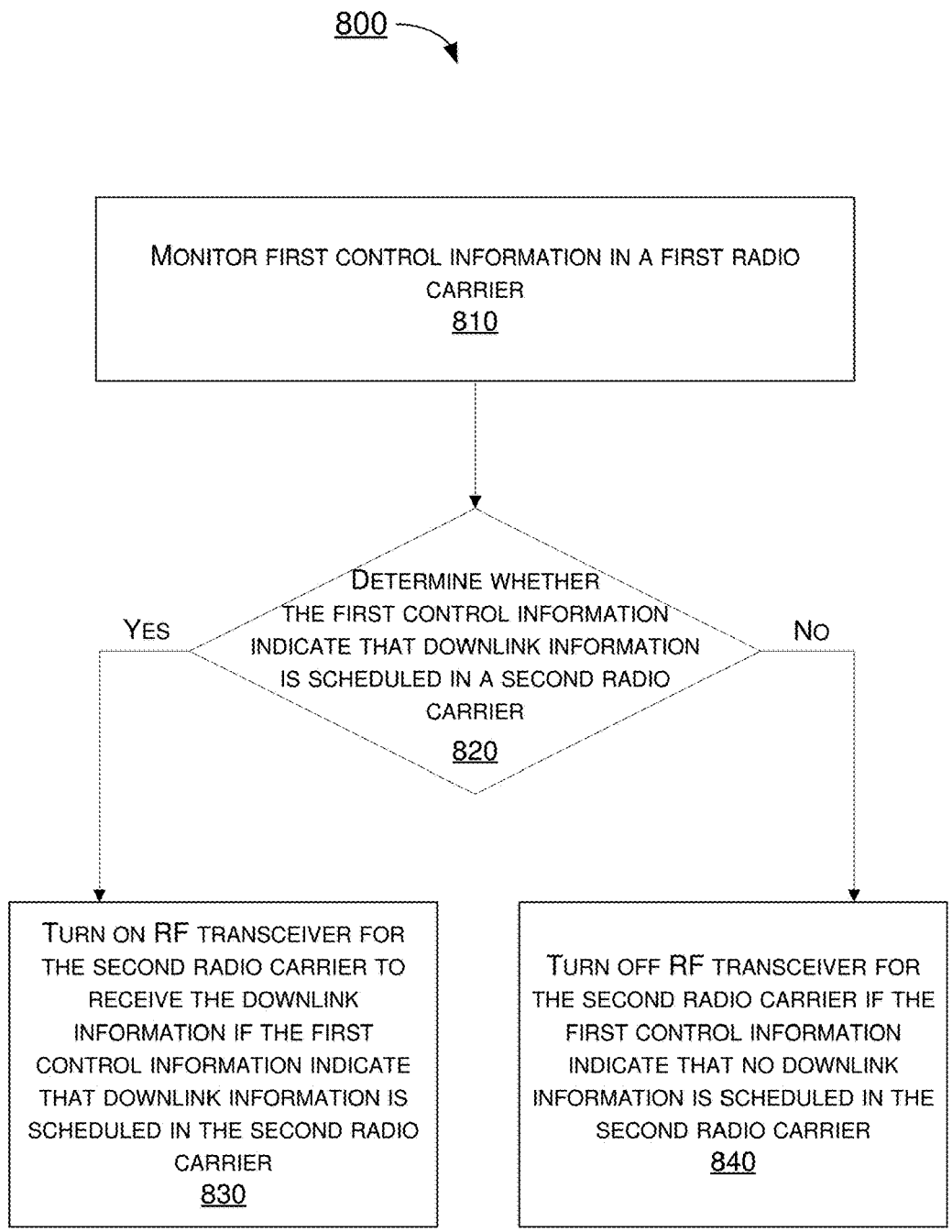
FIG. 8 is a flowchart of an example process in accordance with an implementation of the present disclosure.

FIG. 8 illustrates an example process 800 in accordance with an implementation of the present disclosure. Process 800 may be an example implementation of scenarios 300 and 400, whether partially or completely, with respect to power consumption reduction in accordance with the present disclosure. Process 800 may represent an aspect of implementation of features of communication apparatus 610. Process 800 may include one or more operations, actions, or functions as illustrated by one or more of blocks 810, 820, 830 and 840. Although illustrated as discrete blocks, various blocks of process 800 may be divided into additional blocks, combined into fewer blocks, or eliminated, depending on the desired implementation. Moreover, the blocks of process 800 may executed in the order shown in FIG. 8 or, alternatively, in a different order. Process 800 may be implemented by communication apparatus 610 or any suitable UE or machine type devices. Solely for illustrative purposes and without limitation, process 800 is described below in the context of communication apparatus 610. Process 800 may begin at block 810.

At 810, process 800 may involve communication apparatus 610 monitoring first control information in a first radio carrier. Process 800 may proceed from 810 to 820.

At 812, process 800 may involve communication apparatus 610 determining whether the first control information indicate that downlink information is scheduled in a second radio carrier. If yes, process 800 may proceed from 820 to 830. If no, process 800 may proceed from 820 to 840.

At 813, process 800 may involve communication apparatus 610 turning on RF transceiver for the second radio carrier to receive the downlink information if the first control information indicate that downlink information is scheduled in the second radio carrier.

At 814, process 800 may involve communication apparatus 610 turning off RF transceiver for the second radio carrier if the first control information indicate that no downlink information is scheduled in the second radio carrier.

Figure 9:
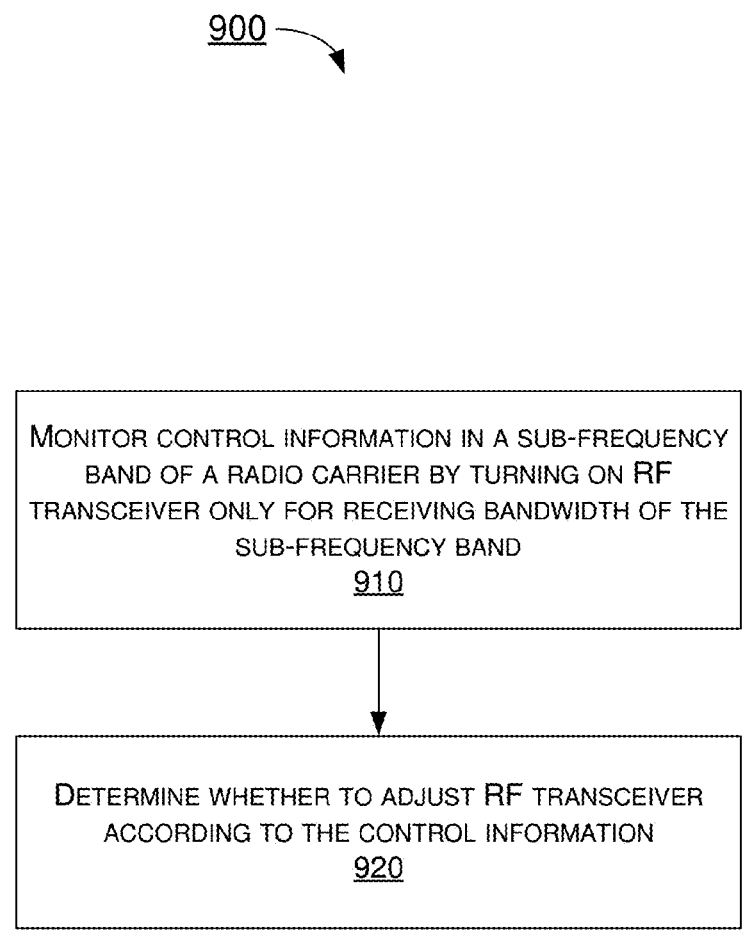
FIG. 9 is a flowchart of an example process in accordance with an implementation of the present disclosure.

FIG. 9 illustrates an example process 900 in accordance with an implementation of the present disclosure. Process 900 may be an example implementation of scenario 500, whether partially or completely, with respect to power consumption reduction in accordance with the present disclosure. Process 900 may represent an aspect of implementation of features of communication apparatus 610. Process 900 may include one or more operations, actions, or functions as illustrated by one or more of blocks 910 and 920. Although illustrated as discrete blocks, various blocks of process 900 may be divided into additional blocks, combined into fewer blocks, or eliminated, depending on the desired implementation. Moreover, the blocks of process 900 may executed in the order shown in FIG. 9 or, alternatively, in a different order. Process 900 may be implemented by communication apparatus 610 or any suitable UE or machine type devices. Solely for illustrative purposes and without limitation, process 900 is described below in the context of communication apparatus 610. Process 900 may begin at block 910.

At 910, process 800 may involve communication apparatus 610 monitoring control information in a sub-frequency band of a radio carrier by turning on RF transceiver only for receiving bandwidth of the sub-frequency band. Process 900 may proceed from 910 to 920.

At 910, process 800 may involve communication apparatus 610 determining whether to adjust RF transceiver according to the control information.

In some implementations, process 800 may further involve communication apparatus 610 adjusting the RF transceiver to monitoring the control information in another sub-frequency band of a radio carrier if the control information indicates frequency hopping.

In some implementations, process 800 may further involve communication apparatus 610 adjusting the RF transceiver to receive full bandwidth of the radio bearer if the control information indicates to switch from a power saving mode to a normal mode.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    receiving, by a processor of an apparatus, first control information in a first transmission time interval (TTI);
    receiving, by the processor, a frequency region of downlink data; and
    adjusting, by the processor, a radio frequency (RF) transceiver of the apparatus,
    wherein the first control information indicates whether the downlink data for the apparatus is scheduled in a second TTI, and
    wherein the adjusting of the RF transceiver comprises adjusting the RF transceiver if the frequency region of the downlink data is different from a frequency region of the first control information.

2. The method of claim 1, wherein the first control information is received before a partial TTI, a whole TTI or a plurality of TTIs in advance the second TTI.

3. The method of claim 1, wherein a time duration between the first control information and the second TTI is indicated by physical layer signaling, configured by radio resource control (RRC) layer signaling, or configured by RRC layer signaling with a further indication of physical layer signaling.

4. The method of claim 1, further comprising:
    adjusting, by the processor, the RF transceiver of the apparatus in part of the second TTI to receive the downlink data if the first control information indicates that the downlink data is scheduled in the second TTI, wherein the downlink data is scheduled in time division multiple access (TDMA) resource allocation.

5. The method of claim 1, further comprising:
    turning off, by the processor, a radio frequency (RF) transceiver of the apparatus in a data region of the second TTI to reduce power consumption if the first control information indicates that no downlink data is scheduled in the second TTI.

6. The method of claim 1, wherein the downlink data is scheduled in physical downlink shared channel (PDSCH) resources.

7. A method, comprising:
    monitoring, by a processor of an apparatus, first control information in a first radio carrier;
    determining, by the processor, whether to adjust a radio frequency (RF) transceiver of the apparatus to receive downlink information in a second radio carrier according to the first control information; and
    adjusting, by the processor, the RF transceiver of the apparatus responsive to at least one of a plurality of conditions being met,
    wherein the first control information indicates whether downlink information for the apparatus is scheduled in the second radio carrier, and
    wherein a first condition of the plurality of conditions comprises a frequency region of downlink data being different from a frequency region of the first control information.

8. The method of claim 7, wherein a second condition of the plurality of conditions comprises the first control information indicating the second control information to be received is scheduled in the second radio carrier.

9. The method of claim 8, further comprising:
    adjusting, by the processor, the RF transceiver to receive downlink data in the second radio carrier according to the second control information,
    wherein the second control information indicates whether downlink data for the apparatus is scheduled in the second radio carrier.

10. The method of claim 7, wherein a third condition of the plurality of conditions comprises the first control information indicating that the downlink data is scheduled in the second radio carrier.

11. The method of claim 7, further comprising:
    turning off, by the processor, the RF transceiver for the second radio carrier to reduce power consumption if the first control information indicates that no downlink information for the apparatus is scheduled in the second radio carrier.

12. The method of claim 7, wherein the processor turns on a predetermined frequency-time region of the second radio carrier solely for receiving the downlink information.

13. The method of claim 7, wherein the downlink information is scheduled in a second TTI and the first control information is received before a partial TTI, a whole TTI or a plurality of TTIs in advance the second TTI.

14. The method of claim 7, wherein the downlink information is scheduled in enhanced physical downlink control channel (PDCCH) resources or in physical downlink shared channel (PDSCH) resources.

15. A method, comprising:
    monitoring, by a processor of an apparatus, control information in a first sub-frequency band of a radio carrier; and
    determining, by the processor, whether to adjust a radio frequency (RF) transceiver of the apparatus according to the control information, wherein the RF transceiver is turned on solely for receiving bandwidth of the first sub-frequency band of the radio carrier in a power saving mode.

16. The method of claim 15, wherein the control information carries a control channel indication for indicating at least one of frequency hopping, switching to a normal mode and reporting channel quality information.

17. The method of claim 16, further comprising:
adjusting, by the processor, the RF transceiver to monitoring the control information in a second sub-frequency band of a radio carrier if the control channel indication indicates frequency hopping.

18. The method of claim 16, further comprising:
adjusting, by the processor, the RF transceiver to receive full bandwidth of the first radio bearer if the control channel indication indicates switching to a normal mode.

19. The method of claim 18, wherein the processor comprises a first processor and a second processor and, wherein the apparatus enables the first processor in the power saving mode and enable the second processor in the normal mode.

* * * * *